(12) United States Patent
Ergut

(10) Patent No.: US 8,795,602 B2
(45) Date of Patent: Aug. 5, 2014

(54) MULTI-STREAM FEED INJECTOR

(75) Inventor: Ali Ergut, Houston, TX (US)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 13/249,114

(22) Filed: Sep. 29, 2011

(65) Prior Publication Data

US 2013/0084224 A1    Apr. 4, 2013

(51) Int. Cl.
*C10J 3/50* (2006.01)
*B01J 4/00* (2006.01)
*F23D 11/38* (2006.01)

(52) U.S. Cl.
CPC *B01J 4/002* (2013.01); *B01J 4/005* (2013.01); *C10J 3/506* (2013.01); *F23D 11/38* (2013.01); *C10J 2200/152* (2013.01)
USPC ........... 422/232; 422/220; 239/400; 239/404; 239/405; 48/86 R; 110/263; 110/265

(58) Field of Classification Search
CPC .............. B01J 4/00; B01J 4/005; C10J 3/50; C10J 3/506; C10J 2200/152; F23D 11/38
USPC .................. 422/232, 220; 239/400, 404, 405; 48/86 R; 110/263, 265
See application file for complete search history.

(56) References Cited

U.S. PATENT DOCUMENTS

| 4,443,228 | A | * | 4/1984 | Schlinger | 48/86 R |
|---|---|---|---|---|---|
| 4,846,666 | A | * | 7/1989 | Bilawa et al. | 431/8 |
| 6,116,171 | A | * | 9/2000 | Oota et al. | 110/263 |
| 7,434,401 | B2 | * | 10/2008 | Hayashi | 60/743 |

* cited by examiner

*Primary Examiner* — Lessanework Seifu
(74) *Attorney, Agent, or Firm* — Fletcher Yoder, P.C.

(57) ABSTRACT

In certain embodiments, a feed injector system includes an inner channel configured to convey at least one of a solid fuel feed or a liquid reactant or moderator to a reaction zone. A first oxidizer channel extends around the inner channel, wherein the first oxidizer channel is configured to convey a first oxidizer stream to the reaction zone. A second oxidizer channel extends around the first oxidizer channel, wherein the second oxidizer channel is configured to convey a second oxidizer stream to the reaction zone. Additionally, a third channel extends around the inner channel and the first and second oxidizer channels, wherein the third channel is configured to convey at least one of the solid fuel feed or the liquid reactant or moderator to the reaction zone.

9 Claims, 5 Drawing Sheets

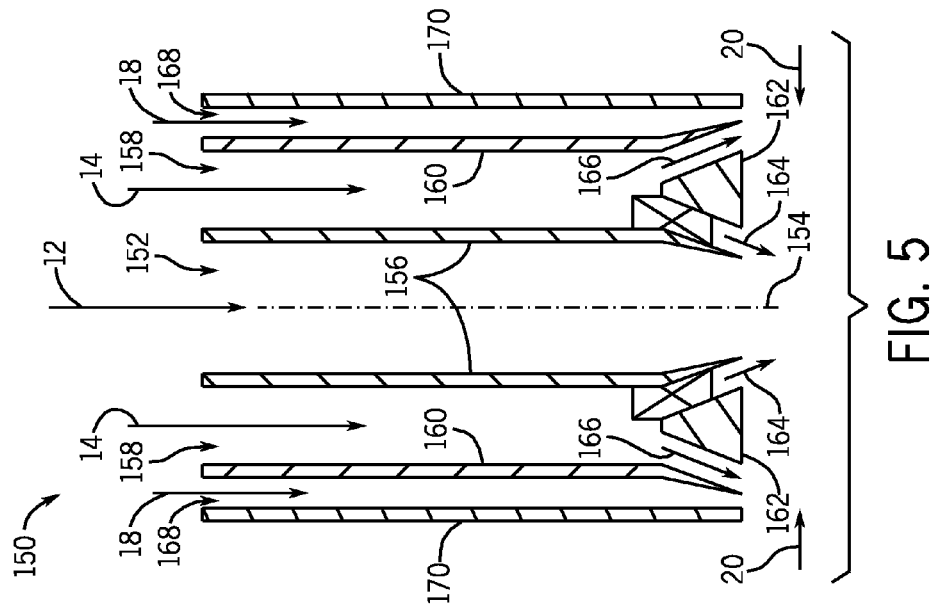
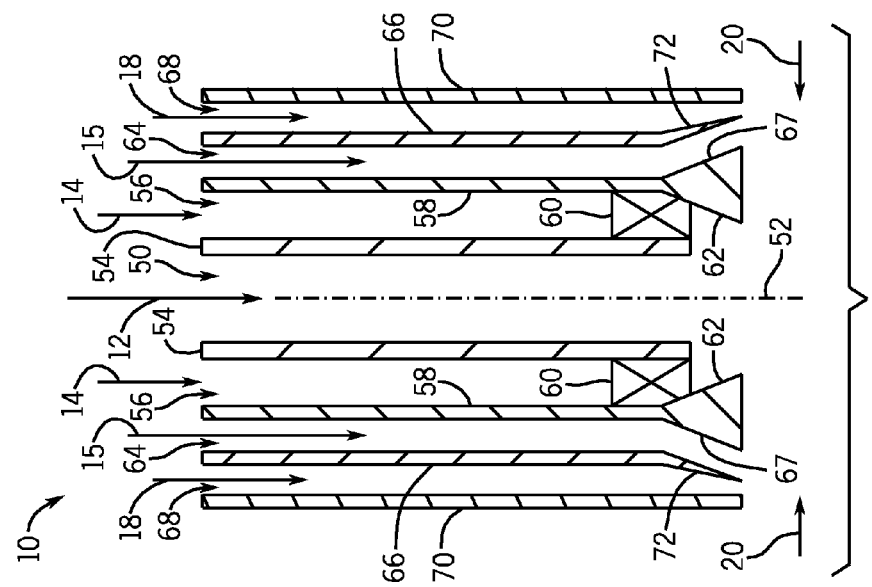

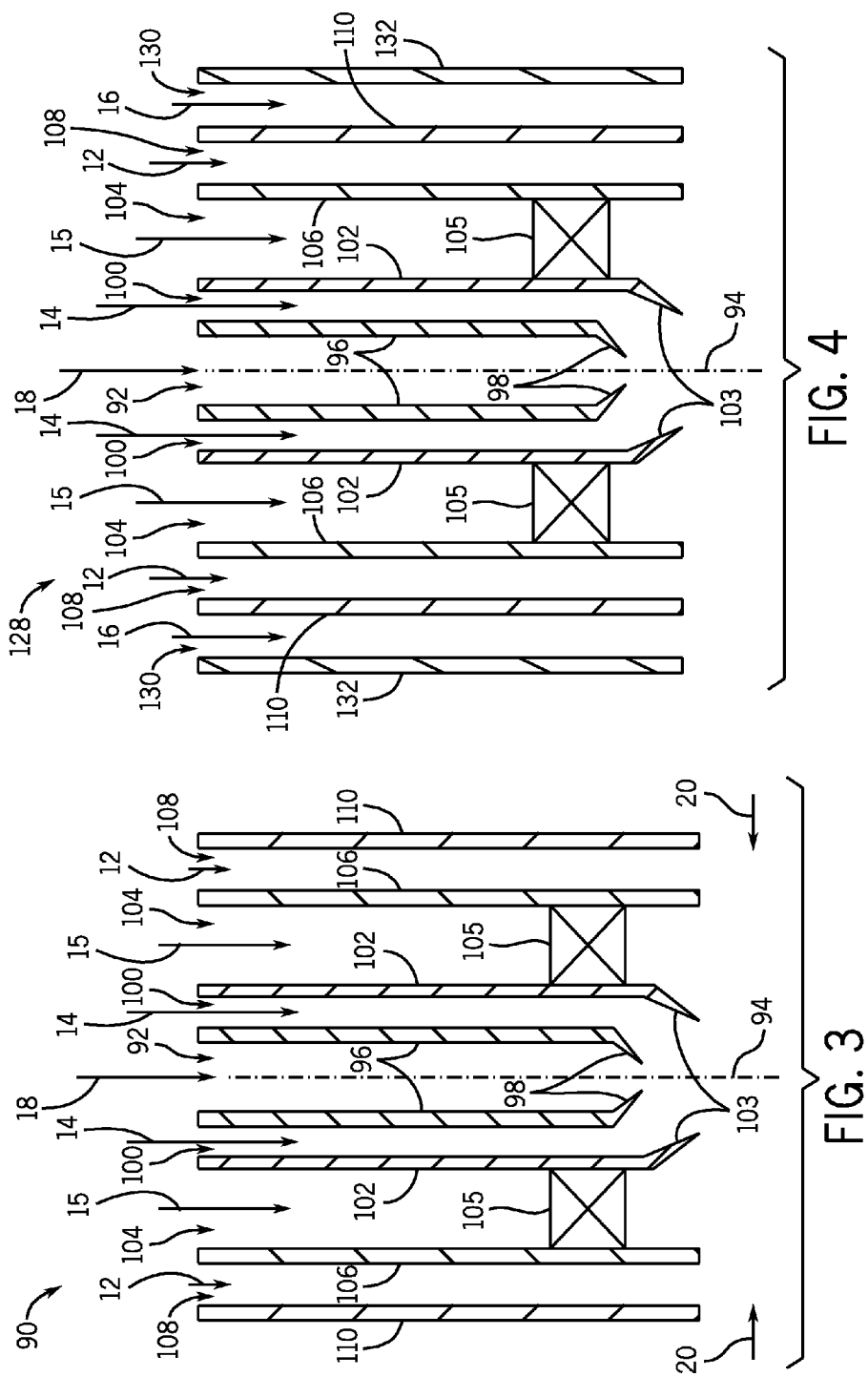

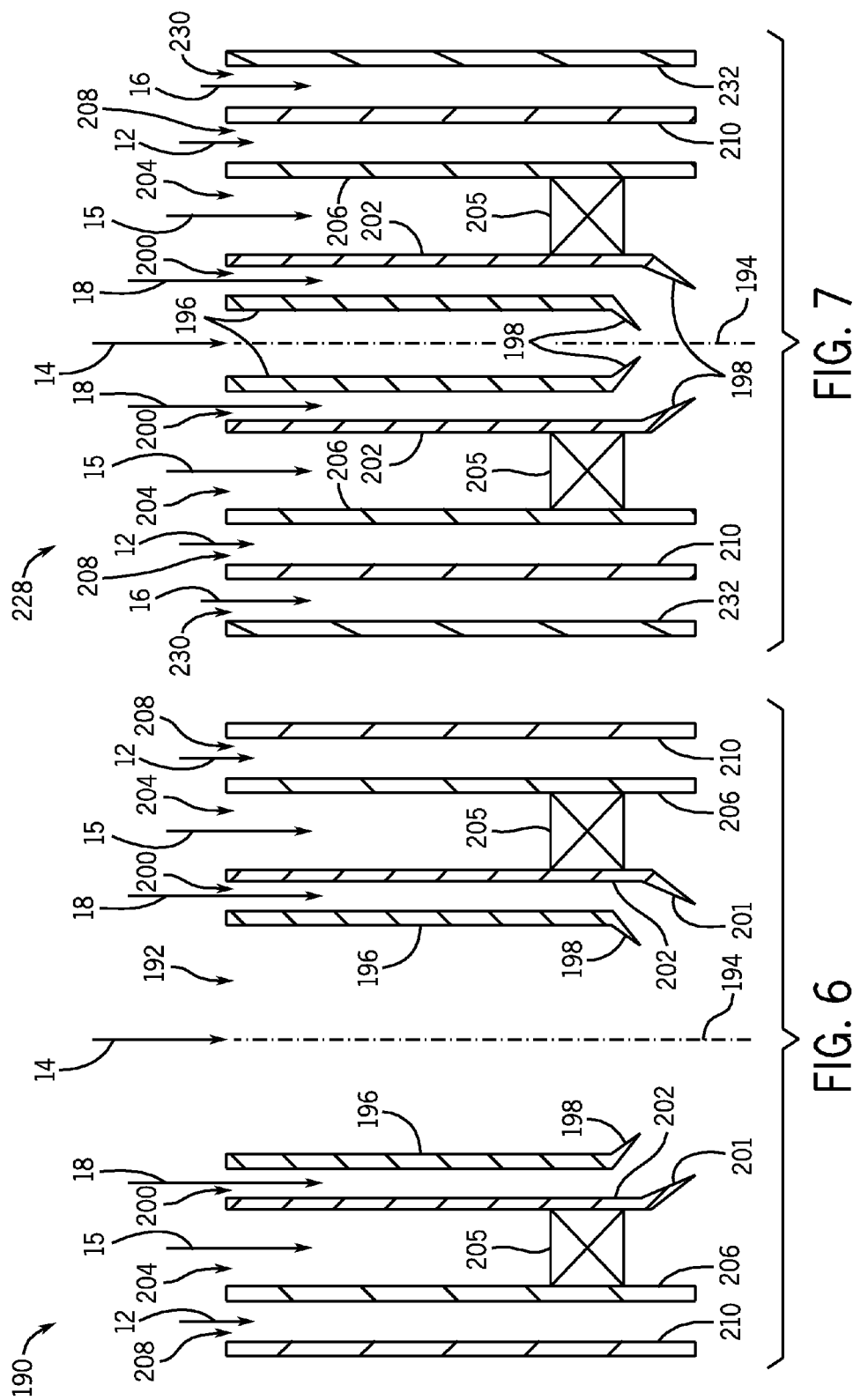

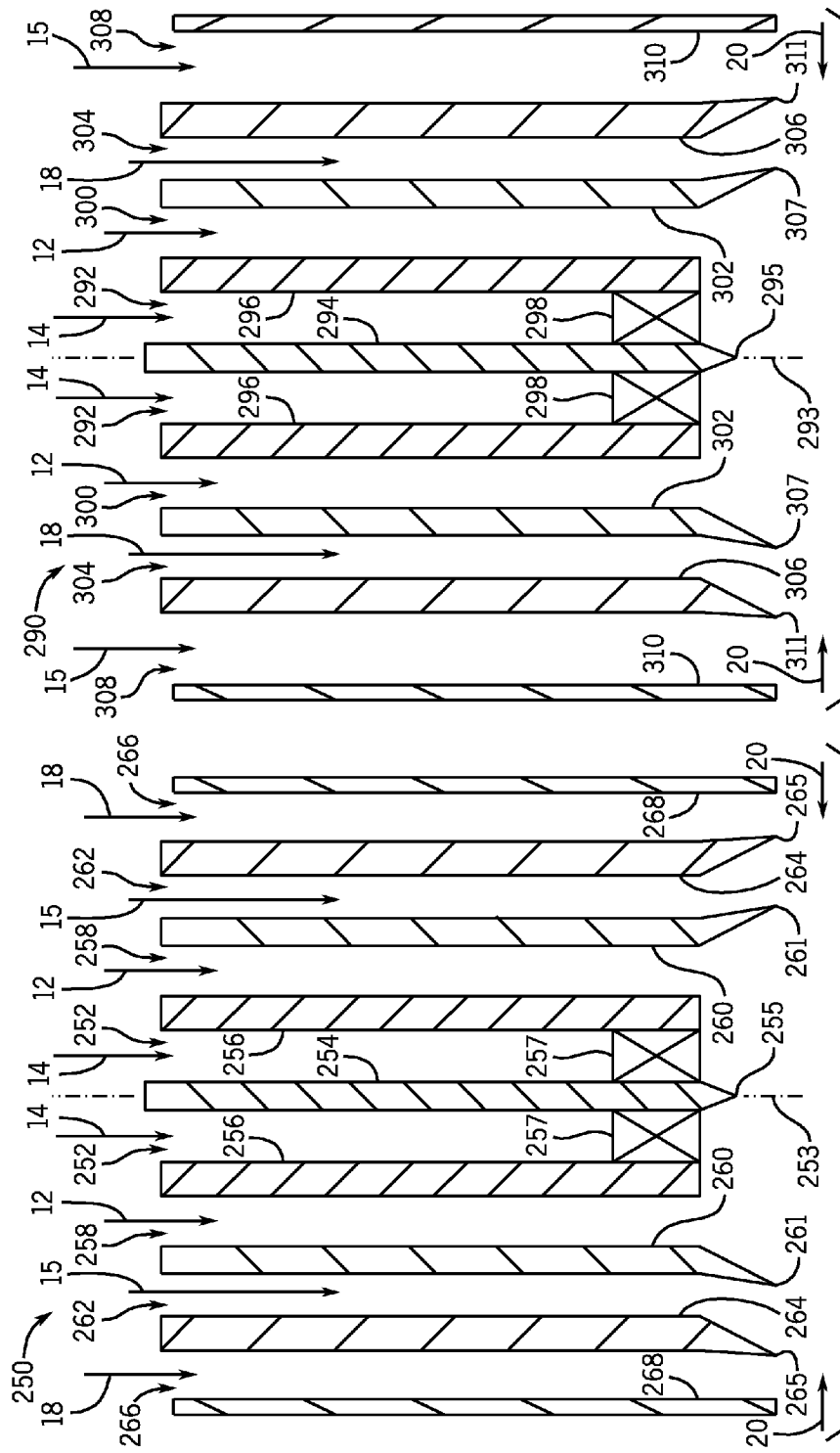

MULTI-STREAM FEED INJECTOR

BACKGROUND OF THE INVENTION

The subject matter disclosed herein relates to gasification, and, more particularly, to feed injectors for gasifiers.

In gasifiers, solid feeds entrained in conveyance gases, oxidizers, and liquid or gas reactants, or a combination thereof, are often injected into the gasifier from two or more separate feed sources through a feed injector system that couples the feed sources to a feed nozzle. The feed streams mix and react in a reaction zone downstream of the feed nozzle, thereby producing a synthetic gas (i.e., "syngas"). Unfortunately, the feed streams may experience poor mixing, which can reduce the efficiency of gasification in the reaction zone. Accordingly, a need exists for enhanced mixing of solid feeds with oxidizers in gasifiers.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a feed injector system includes an inner channel configured to convey a solid fuel feed or a liquid reactant or moderator to a reaction zone. Additionally, the feed injector system includes a first oxidizer channel extending around the inner channel, wherein the first oxidizer channel is configured to convey a first oxidizer stream to the reaction zone. A second oxidizer channel, of the feed injector system, extends around the first oxidizer channel, wherein the second oxidizer channel is configured to convey a second oxidizer stream to the reaction zone. Additionally, a third channel extends around the inner channel and the first and second oxidizer channels, wherein the third channel is configured to convey the solid fuel feed or the liquid reactant to the reaction zone.

In a second embodiment, a feed injector system includes an inner oxidizer channel configured to convey a first oxidizer stream to a reaction zone. A solid fuel channel extends around the inner oxidizer channel, wherein the solid fuel channel is configured to convey a solid fuel feed to the reaction zone. Additionally, a liquid reactant or moderator channel extends around the inner oxidizer channel, wherein the liquid reactant channel is configured to convey a liquid reactant to the reaction zone. A second oxidizer channel, of the feed injector system, extends around the solid fuel channel, the liquid reactant channel, or a combination thereof, wherein the second oxidizer channel is configured to convey a second oxidizer stream to the reaction zone.

In a third embodiment, a feed injector system includes a central channel configured to convey a solid fuel feed or a liquid reactant or moderator to a reaction zone. Additionally, an oxidizer channel extends around the central channel, wherein the oxidizer channel is configured to receive a main oxidizer stream and to divide the main oxidizer stream into first and second oxidizer sub-streams via an insert disposed in the annular oxidizer channel. A second annular channel, of the feed injector system, extends around the central channel and the oxidizer channel, wherein the second channel is configured to convey the solid fuel feed or the liquid reactant or moderator to the reaction zone.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a partial cross-sectional view of an embodiment of a feed injector system, illustrating a central solid feed channel, adjacent first and second oxidizer channels, and an outer liquid reactant channel;

FIG. 3 is a partial cross-sectional view of an embodiment of a feed injector system, illustrating a central liquid reactant channel, adjacent first and second oxidizer channels, and an outer solid feed channel;

FIG. 4 is a partial cross-sectional view of an embodiment of the feed injector system of FIG. 3, illustrating an additional outer oxidizer channel;

FIG. 5 is a partial cross-sectional view of an embodiment of a feed injector system similar to the embodiment of FIG. 2, illustrating a single oxidizer channel split into two substreams by an insert;

FIG. 6 is a partial cross-sectional view of an embodiment of a feed injector system, illustrating a first oxidizer stream being conveyed through a circular inner channel, a liquid reactant or moderator being conveyed through a first annular channel, a second oxidizer stream being conveyed through a second annular channel, and a solid feed being conveyed through a third annular channel;

FIG. 7 is a partial cross-sectional view of an embodiment of a feed injector system similar to FIG. 6, illustrating a third oxidizer stream being introduced through a fourth annular channel;

FIG. 8 is a partial cross-sectional view of an embodiment of a feed injector system, illustrating a solid feed channel disposed between an inner oxidizer channel, a second oxidizer channel, and an outer liquid reactant channel; and FIG. 9 is a partial cross-sectional view of an embodiment of a feed injector system, illustrating a solid feed channel disposed between an inner oxidizer channel, a liquid reactant channel, and an outer second oxidizer channel.

DETAILED DESCRIPTION OF THE INVENTION

Figure 1:
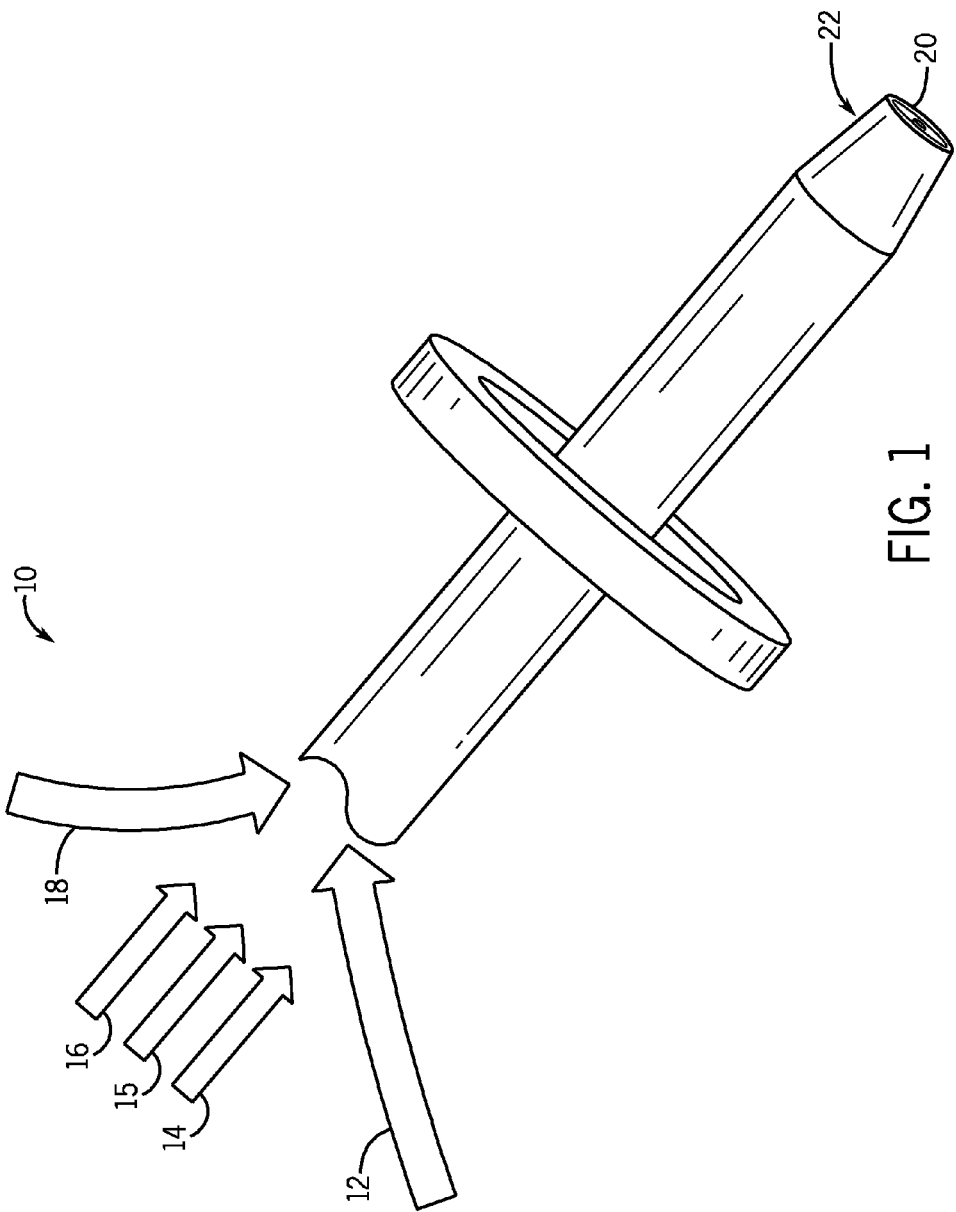
FIG. 1 is a perspective view of an embodiment of a feed injector system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements.

The terms "comprising," "including," and "having" are intended to be inclusive and mean that there may be additional elements other than the listed elements.

FIG. 1 is a perspective view of an embodiment of a feed injector system 10 for use in gasifiers. The feed injector system 10 is configured to inject dry feed streams 12, oxidizer streams 14, 15, 16, and liquid reactant or moderator streams 18. The streams 12, 14, 15, 16, and/or 18 traverse the feed injector system 10 through internal channels, and are combined right before the tip, in a premixing zone or in a reaction zone 20 downstream from a discharge end 22 of the feed injector system 10. For example, the dry feed streams may include hydrocarbons such as pulverized coal, slagging additive, biomass; the oxidizer streams may include oxygen-rich gas, steam or a mixture thereof, and the liquid reactant streams may include water, a liquid carrier fluid and carbonaceous fuel, slagging additive, recycled solids, or a combination thereof. The streams mix and react to create a "syngas" that may be supplied to a combustor of a gas turbine engine or to a chemical processing facility to produce chemicals such as urea, methanol etc. Many stream combinations may be utilized in the production of syngas. In particular, as described in greater detail below, the feed injector system 10 may include a plurality of different configurations of generally concentric channels for pneumatically conveying the dry feed streams 12 (e.g., pulverized solid fuel feed), oxidizer streams 14, 15, 16, and liquid reactant or moderator streams 18 through the feed injector system 10. For example, the dry feed streams 12 may be pneumatically conveyed by entraining the dry feed streams 12 with a conveyance gas, and introducing the entrained dry feed streams 12 through internal channels of the feed injector system 10.

For example, FIGS. 2-4 each illustrate an embodiment of a feed injector system having adjacent annular oxidizer channels. The adjacent annular oxidizer channels improve mixing by directing multiple streams of reactive oxidizers to the surround channels and provide operational flexibility to plant operators to actively control physical and chemical processes inside the gasifier. In FIG. 2, the feed injector system 10 includes a circular inner channel 50 formed around an axis of symmetry 52 and defined by a first annular wall 54. The circular inner channel 50 is configured to pneumatically convey a pulverized solid fuel feed 12 to the reaction zone 20.

A first annular oxidizer channel 56 is substantially concentric with and disposed around the circular inner channel 50. In particular, the first annular oxidizer channel 56 is defined by the first annular wall 54 and a second annular wall 58 that is substantially concentric with the first annular wall 54. The first annular oxidizer channel 56 conveys a first oxidizer stream 14 through the feed injector system 10. In certain embodiments, swirl vanes 60 may be disposed inside the first annular oxidizer channel 56 and near a downstream end of the first annular oxidizer channel 56. The swirl vanes 60 may impart angular momentum to the first oxidizer stream 14 flowing through the first annular oxidizer channel 56. Additionally, in certain embodiments, the first annular oxidizer channel 56 may be configured with a converging tip configuration 62 (e.g., converging conical tip) proximate to the reaction zone 20 of the feed injector system 10. The converging tip configuration 62 directs the first oxidizer stream 14 towards the axis of symmetry 52.

A second annular oxidizer channel 64 is adjacent to and substantially concentric with the first annular oxidizer channel 56. The second annular oxidizer channel 64 is defined by the second annular wall 58 and a third annular wall 66 that is substantially concentric with the second annular wall 58. The second annular oxidizer channel 64 conveys the second oxidizer stream 15 through the feed injector system 10. In certain embodiments, the second annular oxidizer channel 64 may be configured with a diverging tip configuration 67 (e.g., diverging conical tip), which directs the second oxidizer stream 15 radially outward away from the axis of symmetry 52. As illustrated, in certain embodiments, the converging tip configuration 62 and the diverging tip configuration 67 may be combined into a single solid annular section that extends from a downstream end of the second annular wall 58, which may be cooled with a cooling agent flowing through channels inside the annular section.

A third annular channel 68 is substantially concentric with and disposed around the circular inner channel 50 and the first and second annular oxidizer channels 56, 64. The third annular channel 68 is defined by the third annular wall 66 and an outer annular wall 70 of the feed injector system 10. The third annular channel 68 is configured to convey the liquid reactant or modifier 18 to the reaction zone 20. As illustrated, in certain embodiments, the third annular wall 66 includes a diverging tip configuration 72 (e.g., diverging conical tip) that extends from a downstream end of the third annular wall 66, wherein the diverging tip configuration 72 directs the liquid reactant 18 radially outward away from the axis of symmetry 52 and toward the outer annular wall 70 of the feed injector system 10. The kinetic energies and directions of the liquid reactant or moderator 18 and the second oxidizer stream 15, which are both directed radially outwards, may be adjusted such that the liquid reactant 18 is effectively atomized into droplets. Furthermore, the droplets reduce local temperatures near the reaction zone 20 including the feed injector system 10.

For example, the angles 73 of the converging tip configuration 62 and diverging tip configurations 67, 75 may be altered to adjust the relative velocities of the streams. In certain embodiments, the angle 73 of the converging tip configuration 62 relative to the axis of symmetry 52 may be approximately 135 degrees. In alternative embodiments, the angle 73 of the converging tip configuration 62 may be in a range of approximately 90 to 180 degrees depending on the application. Furthermore, in certain embodiments, the angles 75 of the diverging tip configurations 67, 72 relative to the axis of symmetry 52 may be approximately 225 degrees. In alternative embodiments, the angles 75 of the diverging tip configurations 67, 72 may be in a range of approximately 180 to 270 degrees depending on the application. In some embodiments, the angular relationship between the converging tip configuration 62 and the diverging tip configurations 67, 72 to may be proportional. For example, the converging tip configuration 62 may be approximately 135 degrees and the angle 75 of the diverging tip configurations 67, 72 may both be approximately 225 degrees. In alternative embodiments, the angles 75 of the two diverging tip configurations 67, 72 may be unequal, and one or both may be greater or less than the angle 73 of the proportional converging tip configuration 62.

The embodiment of FIG. 2 may decrease the likelihood of having a high temperature flame close to the tip of the feed injector system 10, because the liquid reactant or moderator 18 is in the outer most channel 68, preventing direct contact of highly reactive oxygen with recirculating syngas inside the gasifier.

FIG. 3 illustrates a feed injector system 90 where the liquid reactant or moderator 18 is conveyed through a circular inner channel 92. In this embodiment, the feed injector system 90 includes a circular inner channel 92 formed around an axis of symmetry 94 and defined by a first annular wall 96. As illustrated, in certain embodiments, the circular inner channel 92 is configured with a converging tip configuration 98 at a downstream end of the first annular wall 96. The converging tip accelerates the liquid reactant or moderator 18 at the tip to adjust the liquid kinetic energy per process conditions.

A first annular oxidizer channel 100 is substantially concentric with and disposed around the circular inner channel 92. In particular, the first annular oxidizer channel 100 is defined by the first annular wall 96 and a second annular wall 102 that is substantially concentric with the first annular wall 96. The first annular oxidizer channel 100 conveys the first oxidizer stream 14 through the feed injector system 90. Additionally, in certain embodiments, the first annular oxidizer channel 100 may be configured with a converging tip configuration 103 at a downstream end of the second annular wall 102. The converging tip configuration 103 directs the first oxidizer stream 14 radially inward towards the axis of symmetry 94. Indeed, the first annular oxidizer channel 100 may be configured to impinge the liquid reactant or moderator 18 directly. More specifically, the converging tip configuration 103 directs the first oxidizer stream 14 into the liquid reactant or moderator 18 along the axis of symmetry 94 for effective atomization of the liquid.

The angles 73 of the converging tip configurations 98, 103 may be approximately 135 degrees with respect to the axis of symmetry 94. In alternative embodiments, the angles 73 of the converging tip configurations 98, 103 may be in a range of approximately 90 to 180 degrees with respect to the axis of symmetry 94. Additionally, the angles 73 of the converging tip configurations 98, 103 may be different from each other. For example, in certain embodiments, the angle 73 of converging tip configuration 98 may be approximately 135 degrees, whereas the angle 73 of the converging tip configuration 103 may be approximately 150 degrees.

A second annular oxidizer channel 104 is adjacent to and substantially concentric with the first annular oxidizer channel 100. The second annular oxidizer channel 104 is defined by second annular wall 102 and a third annular wall 106 that is substantially concentric with the second annular wall 102. The second annular oxidizer channel 104 conveys the second oxidizer stream 15 through the feed injector system 90. As illustrated, in certain embodiments, swirl vanes 105 may be disposed inside the second annular oxidizer channel 104 near a downstream end of the second annular oxidizer channel 104. The swirl vanes 105 may impart angular momentum to the second oxidizer stream 15. In certain embodiments, the second annular oxidizer channel 104 may be configured with a diverging tip configuration 112 (e.g., diverging conical tip), which directs the second oxidizer stream 104 radially outward away from the axis of symmetry 94.

A third annular channel 108 is substantially concentric with and disposed around the circular inner channel 92 and the first and second annular oxidizer channels 100, 104. The third annular channel 108 is defined by the third annular wall 106 and a fourth annular wall 110 (which, in this embodiment, is an outer annular wall of the feed injector system 90) that is substantially concentric with the third annular wall 106. The third annular channel 108 is configured to convey the pulverized solid fuel feed 12 to the reaction zone 20.

Because the solid fuel 12 is in the outermost channel of the injector system 90, the likelihood of a high temperature flame near the tip of the injector system 90 may be reduced. For example, such placement of the solid fuel 12 may prevent direct contact between highly reactive oxygen with recirculating syngas inside the gasifier, thus reducing the likelihood of a high temperature flame.

In some embodiments (e.g., the feed injector system 128 illustrated in FIG. 4), a third oxidizer stream 16 may be introduced to the embodiment of FIG. 3, through a fourth annular channel 130. The fourth annular channel 130 is substantially concentric with and disposed around the third annular channel 108 and is defined by the fourth annular wall 110 and a fifth annular wall 132 (which, in this embodiment, is an outer annular wall of the feed injector system 128) that is substantially concentric with the fourth annular wall 110. The third oxidizer stream 16 is intended to improve mixing in the reaction zone 20 and to better control the physical and chemical processes inside the gasifier, while still providing the benefits discussed above with respect to FIG. 3. In some embodiments, swirl vanes can be placed inside this third oxidizer channel to impart angular momentum to this third oxidizer stream 16.

As an alternative to having two adjacent oxidizer channels, a singular oxidizer channel 14 can be divided at the tip of the injector 150 by a replaceable insert 162. FIG. 5 illustrates an embodiment of a feed injector system 150 similar to the embodiment of FIG. 2, utilizing a single oxidizer channel 14 that is split into two sub-streams 164, 166 by an insert 162. The feed injector system 150 includes a circular inner channel 152 formed around an axis of symmetry 154 and defined by a first annular wall 156. The circular inner channel 152 is configured to pneumatically convey the pulverized solid fuel feed 12 to the reaction zone 20. As discussed with regards to FIG. 2, the embodiment of FIG. 5 may reduce the likelihood of having a high temperature flame close to the tip of the feed injector system 150. For example, because the liquid reactant or moderator 18 is in the outermost channel, direct contact between highly reactive oxygen and recirculating syngas inside the gasifier may be prevented. Thus, the likelihood of a high temperature flame may be reduced.

A first annular oxidizer channel 158 is substantially concentric with and disposed around the circular inner channel 152. In particular, the first annular oxidizer channel 158 is defined by the first annular wall 156 and a second annular wall 160 that is substantially concentric with the first annular wall 156. The first annular oxidizer channel 158 conveys the first oxidizer stream 14 through the feed injector system 150. In certain embodiments, an insert 162 may be selectively installed into the first annular oxidizer channel 158 at the tip of the feed injector system 150, dividing the first annular oxidizer channel 158 into two sub streams (i.e., a first oxidizer sub-stream 164 and a second oxidizer sub-stream 166). In certain embodiments, swirl vanes 167 may be disposed inside or coupled to the insert 162, and may impart angular momentum to the first oxidizer sub-stream 164.

Additionally, the insert 162 may be configured such that the first oxidizer sub-stream 164 is convergent, directing the first oxidizer sub-stream 164 towards the axis of symmetry 154, while the second sub-stream is divergent, directing the second oxidizer sub-stream 166 away from the axis of symmetry 154. As such, the first oxidizer sub-stream 164 is directed into the solid fuel feed 12, whereas the second oxidizer sub-stream 166 is directed into the liquid reactant or moderator 18.

In addition, in certain embodiments, the first annular wall 156 may include a converging section 169 at a downstream end of the first annular wall 156, wherein the converging section 169 of the first annular wall 156 generally aligns with a converging inner face 171 of the insert 162 to facilitate the convergence of the first oxidizer sub-stream 164 towards the axis of symmetry 154. Similarly, in certain embodiments, the second annular wall 160 may include a diverging section 173 at a downstream end of the second annular wall 160, wherein the diverging section 173 of the second annular wall 160 generally aligns with a diverging outer face 175 of the insert 162 to facilitate the divergence of the second oxidizer substream 166. The angle 73 of the converging section 169 of the first annular wall 156 and a converging inner face 171 of the insert 162 may be approximately 135 degrees with respect to the axis of symmetry 154. In alternative embodiments, the angle 73 of the converging section 169 of the first annular wall 156 and the converging inner face 171 of the insert 162 may be in a range of approximately 90-180 degrees with respect to the axis of symmetry 154. The angle 75 of the diverging section 173 of the second annular wall 160 and a diverging outer face 175 of the insert 162 may be approximately 225 degrees with respect to the axis of symmetry 154. In alternative embodiments, the angle 75 of the diverging section 173 of the second annular wall 160 and the diverging outer face 175 of the insert 162 may be in a range of approximately 180 to 270 degrees with respect to the axis of symmetry 154. In certain embodiments, swirl vanes can be placed at the diverging edge of the insert 162 to impart angular momentum to the oxidizer sub-stream 166.

A second annular channel 168 is substantially concentric with and disposed around the circular inner channel 152 and the first annular oxidizer channel 158. The second annular channel 168 is defined by the second annular wall 160 and an outer annular wall 170 of the feed injector system 150. The second annular channel 168 is configured to convey the liquid reactant 18 to the reaction zone 20. In addition, as described above, the insert 162 may cause the second oxidizer sub-stream 166 to be directed into the liquid reactant 18 flowing from the second annular channel 168.

FIGS. 6-9 each illustrate an embodiment of a feed injector system having an inner oxidizer channel, an annular solid fuel channel, an annular liquid reactant or moderator channel, and a second oxidizer channel disposed around the annular solid fuel channel, the annular liquid reactant or moderator channel, or both the annular solid fuel channel and the annular liquid reactant or moderator channel. Each embodiment also includes swirl vanes in various positions to facilitate mixing. Finally, each embodiment includes converging and/or diverging sections to facilitate mixing between streams.

FIG. 6 illustrates a feed injector system 190 where a first oxidizer stream 14 is conveyed through a circular inner channel 192. In this embodiment, the circular inner channel 192 extends along an axis of symmetry 194 surrounded by a first annular wall 196. Additionally, in certain embodiments, the circular inner channel 192 may be configured with a converging tip configuration 198 (e.g., converging conical tip) at a downstream end of the first annular wall 196, which accelerates the oxidizer stream 14 at the tip to adjust the oxidizer stream kinetic energy per process conditions.

A first annular channel 200 is substantially concentric with and disposed around the circular inner channel 192. The first annular channel 200 is defined by the first annular wall 196 and a second annular wall 202 that is substantially concentric with the first annular wall 196. The first annular channel 200 conveys the liquid reactant or modifier 18 through the feed injector system 190. Additionally, in certain embodiments, the first annular channel 200 may be configured with a converging tip configuration 201 (e.g., converging conical tip), which directs the liquid reactant or moderator 18 towards the axis of symmetry 194. As illustrated, a downstream end of the first annular wall 202 may be configured with the converging tip configuration 201. The angles 73 of the converging tip configurations 198, 201 may both be approximately 135 degrees with respect to the axis of symmetry 194. In alternative embodiments, the angles 73 of the converging tip configurations 198, 201 may both be in a range of approximately 90 to 180 degrees with respect to the axis of symmetry 194. Additionally, the angles 73 of the converging tip configurations 198, 201 may be different from each other. For example, the angle 73 of converging tip configuration 198 may be approximately 135 degrees, whereas the angle 73 of the converging tip configuration 201 may be approximately 120 degrees.

A second annular channel 204 is adjacent to the first annular channel 200. The second annular channel 204 is defined by the second annular wall 202 and a third annular wall 206. The second annular oxidizer channel 204 conveys the second oxidizer stream 15 through the feed injector system 190. In certain embodiments, swirl vanes 205 may be disposed inside the second annular oxidizer channel 204 near a downstream end of the second annular oxidizer channel 204. The swirl vanes 205 may impart angular momentum to the second oxidizer stream 15 flowing through the second annular channel 204. In certain embodiments, the third annular wall 206 may be configured with a diverging tip configuration 207, which directs the second oxidizer stream 15 away from the axis of symmetry 194.

A third annular channel 208 is substantially concentric with and disposed around the circular inner channel 192 and the first and second annular channels 200, 204. The third annular channel 208 is defined by the third annular wall 206 and a fourth annular wall 210 (which, in this embodiment, is an outer annular wall of the feed injector system 190) that is substantially concentric with the third annular wall 206. The third annular channel 208 is configured to convey the pulverized solid fuel feed 12 to the reaction zone 20.

The swirling motion of the oxidizer stream 15 will mix with the surrounding solid fuel stream 12 due to centrifugal expansion of the swirling gases, thus providing enhanced mixing of the feed injector system 190.

In some embodiments (e.g., the feed injector system 228 illustrated in FIG. 7), a third oxidizer stream 16 may be introduced through a fourth annular channel 230. The additional oxidizer stream 16, provides enhanced mixing by imparting an additional oxidizer stream to increase carbon conversion in the feed injector system 228. The fourth annular channel 230 is substantially concentric with the third annular channel 208 and is defined by the fourth annular wall 210 and a fifth annular wall 232 (which, in this embodiment, is an outer annular wall of the feed injector system 228) that is substantially concentric with the fourth annular wall 210. The third oxidizer stream 16 is intended to improve mixing in the reaction zone 20 and to provide operational flexibility to plant operators to control physical and chemical processes inside the gasifier. The three oxidizer streams (14, 15, and 16) can be adjusted during operation to achieve maximum carbon conversion, while controlling the temperature distribution inside the gasifier.

FIG. 8 depicts a feed injector system 250 with a solid fuel feed 12 channel disposed between an inner oxidizer channel 252 and a second oxidizer channel 262. In the embodiment of FIG. 8, the inner oxidizer channel 252 is formed around the axis of symmetry 253. The inner oxidizer channel 252 is defined by a solid center body 254, configured with a converging tip configuration 255 (e.g., converging conical tip) disposed near the reaction zone 20, and a first annular wall 256 within the feed injector system 250 that is substantially concentric with the solid center body 254. In certain embodiments, the inner oxidizer channel 252 may include swirl vanes 257 near a downstream end of the inner oxidizer channel 252. The swirl vanes 257 or other means such as holes may impart a swirling flow to the first fluid oxidizer stream 14 conveyed through the inner oxidizer channel 252. In certain embodiments, swirl vanes 257 or other means that generate swirl can be placed at the tip of annular wall 256 without the need for the central body 254.

An annular solid fuel channel 258 is substantially concentric with and disposed around the inner oxidizer channel 252. The annular solid fuel channel 258 is defined by the first annular wall 256 and a second annular wall 260 that is substantially concentric with the first annular wall 256. In certain embodiments, the second annular wall 260 may be configured with a converging or diverging tip configuration 261 that extends from a downstream end of the second annular wall 260. The annular solid fuel channel 258 conveys the solid fuel feed 12 through the feed injector system 250. The converging tip configuration 261 directs the solid fuel feed 12 towards the axis of symmetry 253 and accelerates the flow at the tip generating a sudden drop of pressure preventing backflow into the annular solid fuel channel 258. The diverging tip configuration 261 directs the solid fuel feed 12 away from the axis of symmetry 253.

A second annular oxidizer channel 262 is adjacent to the annular solid fuel channel 258. The annular oxidizer channel 262 is defined by the second annular wall 260 and a third annular wall 264 that is substantially concentric with the second annular wall 260. In certain embodiments, the third annular wall 264 may also be configured with a diverging tip configuration 265 (e.g., diverging conical tip) that extends from a downstream end of the third annular wall 264. The annular oxidizer channel 262 conveys the second oxidizer stream 15 through the feed injector system 250. The diverging tip configuration 265 directs the second oxidizer stream 15 away from the axis of symmetry 253. In certain embodiments, swirl vanes 269 can be placed inside this second oxidizer channel to impart angular momentum to the second oxidizer stream 15.

An annular liquid reactant or moderator channel 266 is substantially concentric with and disposed around the inner oxidizer channel 252, the annular solid fuel channel 258, and the annular oxidizer channel 262. The annular liquid reactant channel 266 is defined by the third annular wall 264 and a fourth annular wall 268 (which, in this embodiment, is an outer annular wall of the feed injector system 250) that is substantially concentric with the third annular wall 264. As described above, the annular liquid reactant channel 266 may be configured with the diverging tip configuration 265 that extends from a downstream end of the third annular wall 264. The annular liquid reactant channel 266 is configured to convey a liquid reactant 18 to the reaction zone 20. The diverging tip configuration 265 directs the second oxidizer stream 15 towards the liquid reactant or moderator to help to atomize it. Because the liquid reactant 18 is supplied in the outermost channel, direct contact of highly reactive oxidizers with recirculating syngas inside the gasifier may be reduced or even eliminated.

The angle 75 of the diverging tip configurations 261, 265 may both be approximately 225 degrees with respect to the axis of symmetry 253. In alternative embodiments, the angle 75 of the diverging tip configurations 261, 265 may both be in a range of approximately 90-270 degrees with respect to the axis of symmetry 253. For example, the diverging angles 75 of the diverging tip configuration 261 may be greater or less than the proportional diverging angle 75 of the converging tip configuration 265.

Because the liquid reactant 18 is conveyed through the outermost channel, the likelihood of a high temperature flame at the tip of the feed injector system 250 may be reduced. For example, such configuration may prevent direct contact between highly reactive oxygen with recirculating syngas inside the gasifier, thus reducing the likelihood of a high temperature flame.

FIG. 9 illustrates an embodiment of a feed injector system 290 similar to FIG. 8, where the liquid reactant stream 18 and second oxidizer stream 15 are interchanged. Similar to the embodiment of FIG. 8, the feed injector system 290 includes an inner oxidizer channel 292 surrounding an axis of symmetry 293. The inner oxidizer channel 292 is defined by a solid center body 294 configured with a converging tip configuration 295 (e.g., converging conical tip) disposed near the reaction zone 20, and a first annular wall 296 that is substantially concentric with the solid center body 294 within the feed injector system 290. In certain embodiments, the inner oxidizer channel 292 may include swirl vanes or other means 298 near a downstream end of the inter oxidizer channel 292, configured to impart swirling flow to the first fluid oxidizer stream 14 conveyed through the inner oxidizer channel 292.

An annular solid fuel channel 300 is substantially concentric with and disposed around the inner oxidizer channel 292. The annular solid fuel channel 300 is defined by the first annular wall 296 and a second annular wall 302 that is substantially concentric with the first annular wall 296. The annular solid fuel channel 300 conveys the solid fuel feed 12 through the feed injector system 290. In contrast to the embodiment of FIG. 8, the embodiment of FIG. 9 includes an annular liquid reactant or moderator channel 304 that is adjacent to the annular solid fuel channel 300. The annular liquid reactant channel 304 is defined by the second annular wall 302 and a third annular wall 306 that is substantially concentric with the second annular wall 302. The second annular wall 302 may be configured with a converging or diverging tip configuration 307 (e.g., diverging conical tip) disposed near the reaction zone 20. The annular liquid reactant or moderator channel 304 conveys the liquid reactant 18 through the feed injector system 290. The diverging tip configuration 307 directs the liquid reactant 18 away from the axis of symmetry 293.

A second annular oxidizer channel 308 is substantially concentric with and disposed around the inner oxidizer channel 292, the annular solid fuel channel 300, and the annular liquid reactant or moderator channel 304. The second annular oxidizer channel 308 is defined by the third annular wall 306 and a fourth annular wall 310 (which, in this embodiment, is an outer annular wall of the feed injector system 290) that is substantially concentric with the third annular wall 306. The third annular wall 306 may be configured with a converging or diverging tip configuration 311. The second annular oxidizer channel 308 is configured to convey the second oxidizer stream 15 to the reaction zone 20. The diverging tip configuration 311 directs the second oxidizer stream 15 away from the axis of symmetry 293. In some embodiments the fourth annular wall 310 may be configured with a converging tip configuration 312. The converging tip configuration 312 directs the annular oxidizer stream 308 towards the axis of symmetry 293 and accelerates the flow at the tip generating a sudden drop of pressure preventing backflow into the annular oxidizer channel 308.

The angle 75 of the diverging tip configurations 307, 311 may both be approximately 225 degrees with respect to the axis of symmetry 293. In alternative embodiments, the angle 75 of the diverging tip configurations 307, 311 may both be in a range of approximately 90 to 270 degrees with respect to the axis of symmetry 293 depending on the application. In some embodiments, the diverging angles 75 of the diverging tip configurations 307, 311 may not be proportional to each other. For example, the diverging angles 75 of the diverging tip configurations 307 may be greater or less than the diverging angle 75 of the diverging tip configuration 311.

Technical effects of the disclosed embodiments include systems for enhanced mixing of solid feeds entrained in conveyance gases, oxidizers, and liquid reactants or moderators, or a combination thereof. In particular, the feed injector systems described herein include one or more solid fuel feed channels, one or more liquid reactant or moderator channels, and one or more oxidizer channels that provide two or more oxidizer streams to the reaction zone of the feed injector system. For example, in certain embodiments, the solid fuel feed and liquid reactant or moderator channels are separated from one another by two adjacent oxidizer channels. Alternatively, in other embodiments, an inner oxidizer channel is an inner most channel. The inner oxidizer channel is surrounded by an annular liquid reactant or moderator channel, which is surrounded by an annular solid fuel feed channel. A second annular oxidizer channel may be disposed around the annular solid fuel channel, the annular liquid reactant or moderator channel, or a combination thereof. In other embodiments, the feed injector system includes a solid fuel feed channel, a liquid reactant or moderator channel, and an annular oxidizer channel. The annular oxidizer channel is disposed between the solid fuel feed and liquid reactant or moderator channels. An insert may be disposed near the downstream end of the annular oxidizer channel to divide an oxidizer stream conveyed through the oxidizer channel into two oxidizer sub-streams, one directed towards the solid fuel feed channel and the other directed towards the liquid reactant or moderator channel. Swirl vanes or other means that impart angular momentum to oxidizer streams can be added into the oxidizer channels to improve mixing. Other various embodiments are described herein, and each are generally directed toward enhancing mixing of solid feeds entrained in conveyance gases, oxidizers, and liquid reactants, or a combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A feed injector system, comprising:
an inner oxidizer channel configured to convey a first oxidizer stream to a reaction zone;
a solid fuel channel extending around the inner oxidizer channel, wherein the solid fuel channel is configured to convey a solid fuel feed to the reaction zone;
a liquid reactant or moderator channel extending around the inner oxidizer channel, wherein the liquid reactant channel is configured to convey a liquid reactant or moderator to the reaction zone; and
a second oxidizer channel extending around the solid fuel channel, the liquid reactant or moderator channel, or a combination thereof, wherein the second oxidizer channel is configured to convey a second oxidizer stream to the reaction zone;
wherein the liquid reactant or moderator channel and the second oxidizer channel each comprises a diverging tip configured to direct the second oxidizer stream and the liquid reactant radially outward from an axis of the inner channel.

2. The feed injector system of claim 1, wherein the inner oxidizer channel is a circular channel aligned along the axis.

3. The feed injector system of claim 1, comprising swirl vanes or holes configured to impart an angular momentum to the inner oxidizer stream, and wherein the inner oxidizer channel is an annular channel disposed around a circular central body aligned along an axis of symmetry.

4. The feed injector system of claim 2, wherein the second oxidizer channel comprises a swirl vane configured to impart angular momentum to the second oxidizer stream.

5. The feed injector system of claim 3, wherein the inner oxidizer channel comprises a swirl vane or holes configured to impart angular momentum to the first oxidizer stream.

6. The feed injector system of claim 1, wherein the annular liquid reactant or moderator channel extends around the inner oxidizer channel, the second oxidizer channel extends around the liquid reactant channel, and the solid fuel channel extends around the second oxidizer channel.

7. The feed injector system of claim 1, comprising a third oxidizer channel configured to convey a third oxidizer stream to the reaction zone, wherein the third oxidizer channel extends around the solid fuel channel.

8. The feed injector system of claim 2, wherein the solid fuel channel extends around the inner oxidizer channel, the second oxidizer channel extends around the solid fuel channel, the liquid reactant channel extends around the second oxidizer channel, and the second oxidizer channel comprises a diverging tip to direct the second oxidizer stream away from the axis.

9. The feed injector system of claim 2, wherein the solid fuel channel extends around the inner oxidizer channel, the liquid reactant or moderator channel extends around the solid fuel channel, the second oxidizer channel extends around the liquid reactant or moderator channel, and the liquid reactant channel comprises a diverging tip to direct the liquid reactant away from the axis.

* * * * *